V. G. APPLE.
CLUTCH MECHANISM.
APPLICATION FILED MAR. 1, 1915.
1,156,576.
Patented Oct. 12, 1915.
3 SHEETS—SHEET 1.
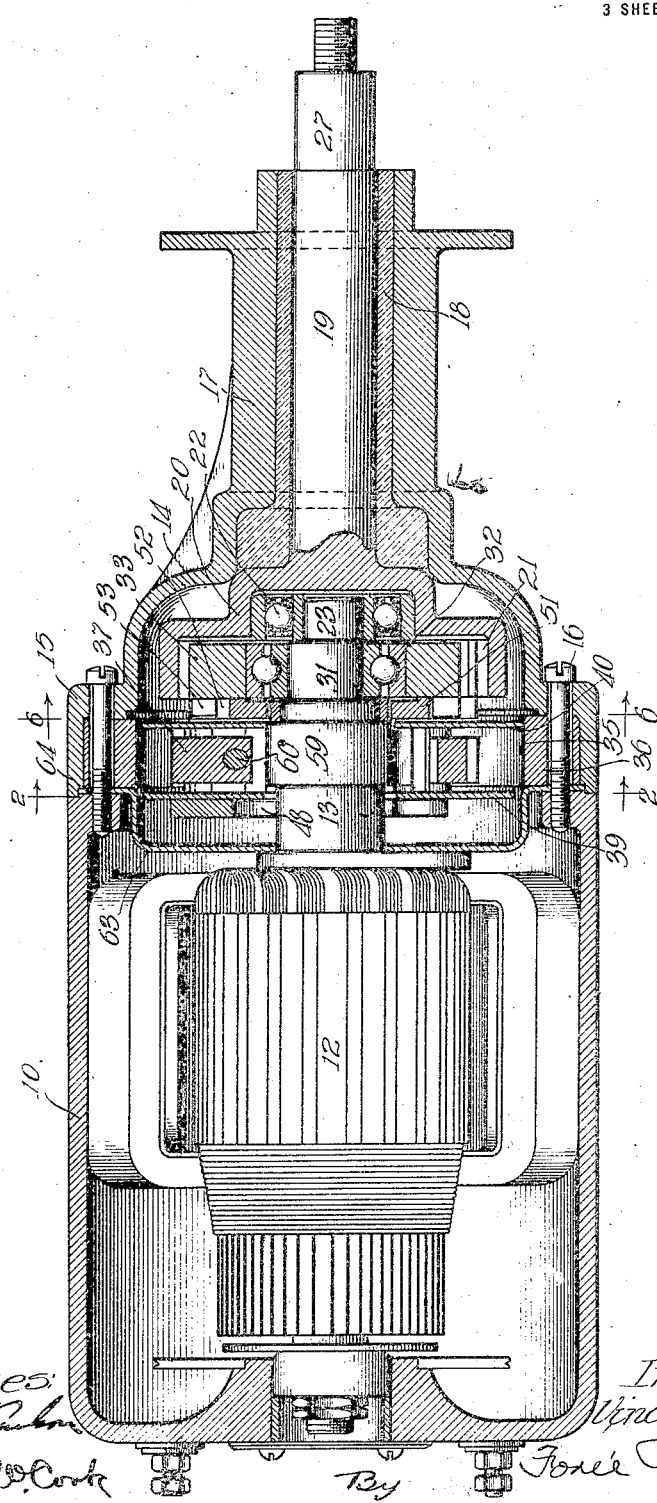

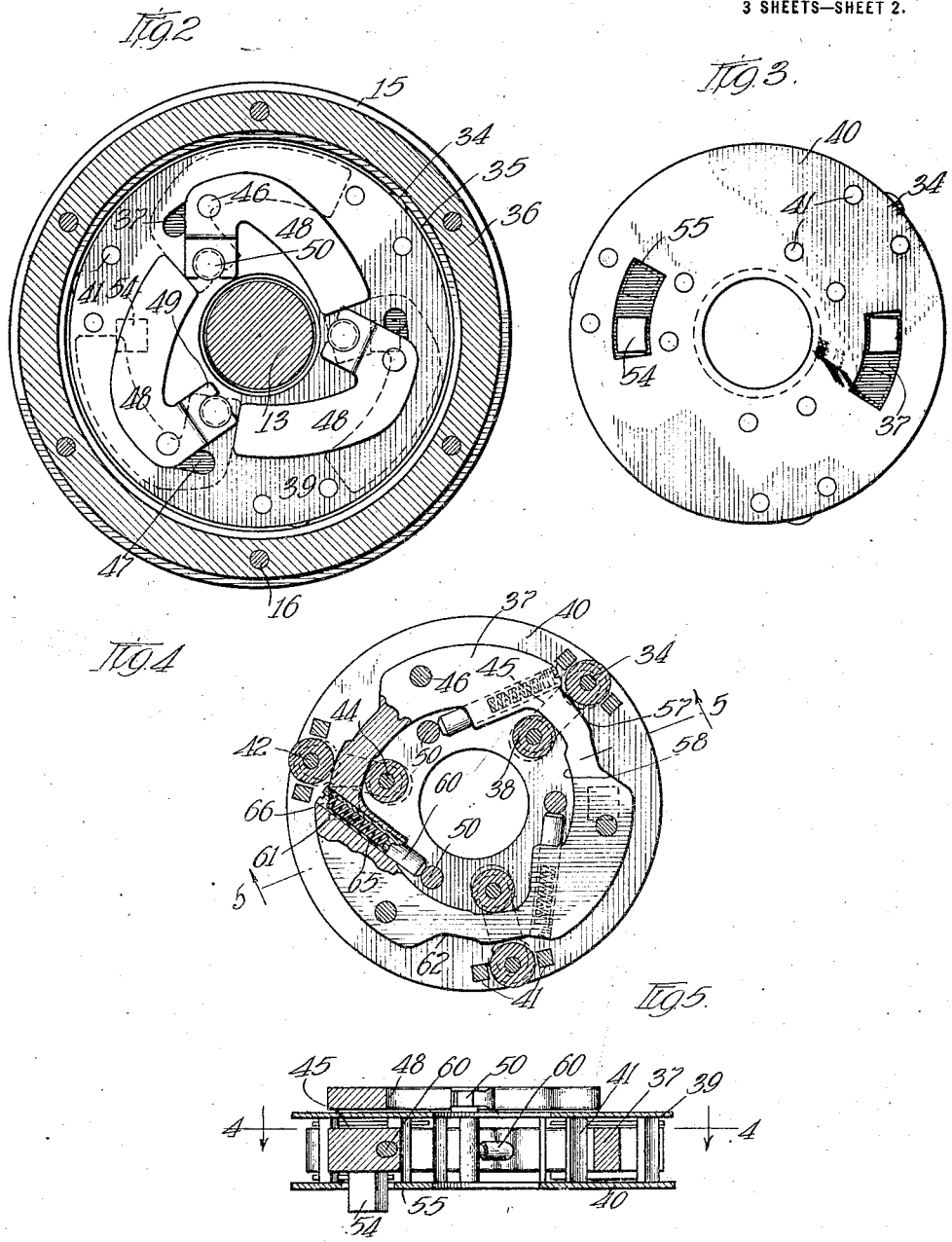

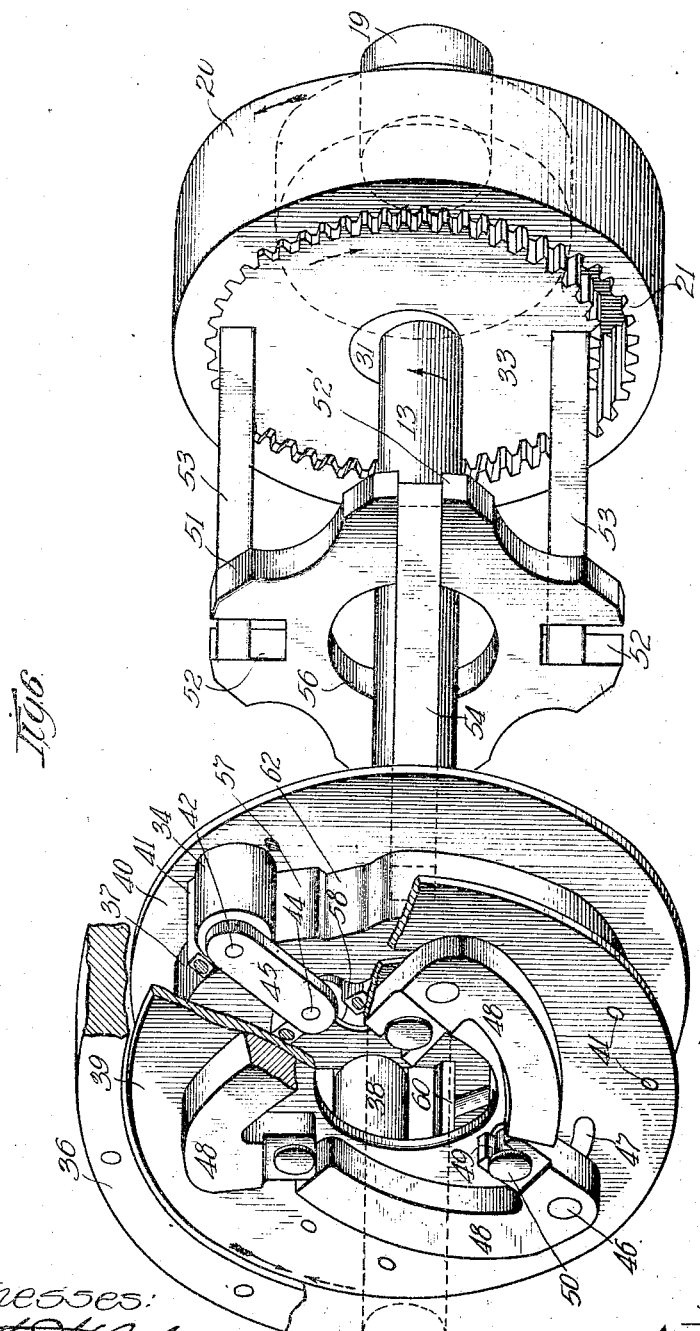

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

CLUTCH MECHANISM.

1,156,576.   Specification of Letters Patent.   Patented Oct. 12, 1915.

Original application filed June 1, 1914, Serial No. 842,205. Divided and this application filed March 1, 1915. Serial No. 11,180.

*To all whom it may concern:*

Be it known that I, VINCENT G. APPLE, a citizen of the United States, residing at Dayton, in the county of Montgomery and State of Ohio, have invented certain new and useful Improvements in Clutch Mechanism, of which the following is a specification.

This invention relates to improvements in clutch mechanism and more particularly to a device adapted for use with a gearing interposed between a dynamo, adapted to serve both as a motor and generator, and an internal combustion engine.

One of the objects of my invention is to provide such a clutch for use in connection with a transmission gearing interposed between a dynamo and internal combustion engine which, when the dynamo serves as a motor, transmits power at a reduced speed to the shaft of the engine and when the engine takes up its cycle of operation and becomes the driver, it automatically eliminates the reduction gearing and provides a direct drive through to the dynamo for its operation as a generator.

Another object of my invention is to provide such a device for use with gearing of the above described type in which the parts, which move relative to each other when the dynamo serves as a motor, will, on the reversal of the direction of drive, rotate in unison as a single part when the driver attains a predetermined speed.

Still other objects of my invention are to provide such a clutch which shall be efficient, light, positive in its action and sufficiently compact to permit its mounting within the end portion of a dynamo casing.

The gearing with which my clutch is illustrated in its present embodiment forms the subject matter of my Patent No. 1,133,784, dated March 30th, 1915, this application being a division of the application which matured into the aforesaid patent.

Figure 1 is an axial sectional view through my improved gearing showing it mounted upon a dynamo. Fig. 2 is a transverse sectional view on the line 2—2 of Fig. 1. Fig. 3 is an end elevation of the clutch containing part. Fig. 4 is a transverse sectional view on the line 4—4 of Fig. 5, with parts broken away. Fig. 5 is an axial sectional view on the line 5—5 of Fig. 4. Fig. 6 is a pseudo elongated perspective view with parts broken away to graphically illustrate the operation of my gearing.

Referring to the drawings, the numeral 10 indicates the frame of a dynamo electric machine within which is mounted the armature 12 carried on the shaft 13. A bell shaped end casing 14 is flanged as at 15, for connection with an end of the frame 10, by means of the screw 16. The outer end of the casing is reduced in diameter and carries a tubular extension 17 receiving the bearing 18 within which is journaled the shaft 19.

The shaft 19 is flanged outwardly at its inner end, into a double stepped cup shaped part 20, carrying on its outer step the internal gear 21 and at its inner step an annular bearing 22 within which is journaled the forwardly extending reduced end 23 of the shaft 13.

An eccentric 31 is carried by the shaft directly at the rear of the reduced end 23. The annular bearing 32 surrounds the eccentric 31 and carries the pinion 33 meshing with the internal gear 21. This comprises the well known form of eccentric reduction gearing in which the internal gear and the spur gear have a different number of teeth and a slow drive, giving great reduction in speed, effected by the rotation of the eccentric wabbling the spur gear which is held by a universal connection from actual rotation.

For the purpose of holding the spur gear against rotation, when it is desired to transmit power from the dynamo armature through to the shaft 19 I have provided a roller clutch mechanism in which the outer rollers 34 normally engage with the race way 35 formed on the inner face of the ring 36 carried in an annular recess formed in the flanged end 15 of the casing 14.

The clutch mechanism comprises in general a body ring 37, outer rollers 34, inner rollers 38, and the disks 39 and 40 positioned at each side of the body ring 37, rotatable relative thereto, and secured together in spaced relation by the transverse bars 41 positioned in pairs    each side of the rollers. The rollers are carried by transverse pins 42 and 44 joined together by the links 45 which extend radially across the outer edges of the body ring 37 inside the disks 39 and 40. The bars 41 likewise act as roller retaining cages and insure proper positioning of the rollers with respect to the disks 39 and 40.

Pins 46 extend axially from the body ring 37 through arcuate slots 47 in the disk 39 and are journaled in the L shaped governor arms 48 adjacent the shorter legs thereof. The inner ends of the L shaped governor arms 48 are slotted, as at 49, and engage with the pins 50 secured in the disk 39. Outward movement of the longer, heavier ends of the L shaped governor arms 48 cause sliding movement of the pins 46 within the arcuate slots 47 resulting in the relative rotation of the body ring 37 with respect to the disk 39.

In order to provide universal connection between the pinion 33 and the clutch mechanism I have provided a slotted plate 51 resembling somewhat a Maltese cross and having diagonally opposite pairs of slots 52 and 52'. Lugs 53 extend inwardly from the pinion 33 and slidably engage the slots 52 and a second pair of lugs 54 extends forward from the body ring 37 through arcuate slots 55 in the plate 40 and engage with the other pair of slots 52'. The opening 56 at the center of the plate 50 is considerably larger than the shaft 13 so as to permit oscillation or wabbling of the plate 51 without interference.

The outer surface of the body ring 37, adjacent each of the rollers, is inclined or cam shaped, as at 57, for coaction with the rollers 34 and the inner surface of the ring 37 is cam shaped, as at 58, adjacent the inner rollers for coaction therewith. The inner rollers when forced inward by the cam 48 contact with the enlarged portion 59 of the shaft 13.

The pins 50, upon which the governor arms are pivoted extend entirely across the disks 39 and 40 within the body ring 37 and are engaged by the spring pressed plungers 60 carried in openings 61 in the body ring. The plungers 60 are pressed inwardly by the springs 65, the outer ends of which abut against the threaded screws 66 thus providing a means for adjusting the resistance of the centrifugal action of the governor arms and determining the speed at which the inward shifting of the roller clutches 38 and 34 shall take place. The action of the spring pressed plungers 60 is to normally insure the relative positioning of the body ring 37 and disks 39 and 40 so that the rollers 34 are pressed toward the highest points of their cams and consequently outward into engagement with the race way 35.

As the governor arms 48 fly outwardly under the influence of centrifugal action the body ring 37 is rotated relative to the disks 39 and 40 until the outer rollers 34 are positioned opposite the depressions 62 in the body ring and the inner rollers are wedged inward by the cam surfaces 58 until they coact with the shaft enlargement 59 and are then permitted to act as roller clutches gripping the shaft 59 and locking the clutch mechanism thereto.

A cup shaped wall 63 is flanged outwardly as at 64, to lie between the adjoining surfaces of the end wall of the frame 10 and the inner wall of the ring 36, thus inclosing the governor arms and forming a protecting partition between the clutch mechanism and the windings of the dynamo, such as the armature and field coils.

The operation of the device is as follows. Considering first all parts of the apparatus at rest we will assume that the operator wishes to start the internal combustion engine. Closing the proper circuit switch, current is directed through the dynamo armature and field windings causing the shaft 13 to rotate in the direction indicated by the arrow, in Fig. 6. As the internal gear 20 together with its shaft 19 is connected to the shaft of the internal combustion engine the resistance to its rotation is considerable and the first tendency of the pinion 33 will be to rotate about the eccentric 31 in a direction indicated by the dotted arrow. This torque is communicated, through the universal plate 51, to the control member carrying the roller clutches 38 and 34, and its tendency will be to rotate in the same direction with the spur gear 33. As before stated the roller clutches 34 are normally operative, being pressed into engagement with the ring 36 by the cam shaped portion 57 of the ring 37. The tendency of the control member to rotate in the direction indicated by the dotted arrow, is therefore prevented by the locking engagement of the outer roller 34 with the ring 36 and the inevitable result is the rotation of the internal gear wheel 21 in the direction indicated by the solid arrow. In the present instance, the spur gear wheel has a less number of teeth than the internal gear wheel and will therefore drive the spur gear wheel in the same direction as the driving shaft. The engine shaft is thus rotated until the engine takes up its cycle of operation at which time its speed is greatly increased and the reversal of direction in drive causes the internal gear 21 to become the driver, carrying around with it the spur gear 33 and through the medium of the universal plate 51 rotates the control member in the direction indicated by the solid arrow. As the roller clutches 34 are uni-directional in their action the control member is free to rotate in the direction indicated by the solid arrow though locked from rotation in the opposite direction. As the speed of the control member increases the governor arms 48 fly outwardly, under the influence of centrifugal action, rotating the ring 37, relative to the outer disks 39 and 40, thus wedging inwardly the rollers 38 and 34 until the inner rollers 38 engage the enlarged portion 59 of the armature shaft 13. The direction of roller grip is such that on coming in contact with the shaft the rollers 38 instantly lock the control member thereto and the entire gearing, together with its appurtenant parts, rotates as a unit with the armature shaft, the drive being direct from the shaft 19, through to the shaft 13, without reduction of speed. When this direct drive obtains the rollers 34 are drawn inwardly away from contact with the ring 36 and any noise or friction, incident to the engagement of relatively moving parts, is eliminated. Obviously a lessening in speed of the control member permits the spring pressed plunger 60 to rotate the body ring 37, moving outwardly the rollers 38 and 34 until the inner set becomes inoperative and the outer set is pressed into engagement with the ring 36. Changing the tension of the spring actuating the plunger 60 permits adjustment of the governor for operation at any desired speed.

Having described my invention, what I claim is:

1. In a power transmitting mechanism, the combination of a primary rotatable member; a secondary rotatable member; means connecting the said members including a normally inoperative one way roller clutch, and centrifugally operated means for conditioning said roller clutch for operation.

2. In a power transmission mechanism, the combination of a primary shaft; a secondary shaft; means connecting the two shafts, and including a normally inoperative one way roller clutch, and speed responsive means for conditioning said clutch for operation.

3. In a power transmission gearing mechanism, the combination of a primary shaft; a secondary shaft; means connecting the shafts comprising a normally inoperative one way roller clutch, and centrifugally operated means for moving said roller radially into operative position.

4. In a power transmission mechanism, the combination of a primary rotatable member; a second rotatable member; means connecting the two members and including a one way roller clutch, said clutch comprising spaced apart roller positioning disks; a plurality of rollers; a ring between said disks having a roller engaging cam rotatable relative to said disks and speed responsive means for rotating said ring relative to the disks, and causing movement of the rollers radially with respect to the rotatable members.

In testimony whereof I hereunto set my hand in the presence of two subscribing witnesses.

VINCENT G. APPLE.

In the presence of—
  E. V. MARTIN,
  R. E. FLEMING.